US005472289A

United States Patent [19]

Kringel et al.

[11] Patent Number: 5,472,289

[45] Date of Patent: * Dec. 5, 1995

[54] ADVERTISING DISPLAY MOUNTING DEVICE

[75] Inventors: George Kringel, Westport; Robert S. Frichette, Trumbull; James E. Richardson, Weston, all of Conn.

[73] Assignee: ActMedia, Inc., Norwalk, Conn.

[ * ] Notice: The portion of the term of this patent subsequent to Mar. 29, 2011, has been disclaimed.

[21] Appl. No.: 293,438

[22] Filed: Aug. 19, 1994

Related U.S. Application Data

[60] Continuation of Ser. No. 949,991, Sep. 24, 1992, Pat. No. 5,344,250, which is a division of Ser. No. 704,835, May 20, 1991, Pat. No. 5,289,652, which is a continuation of Ser. No. 311,743, Feb. 17, 1989, abandoned.

[51] Int. Cl.$^{6}$ .................................. G09F 3/18; F16B 7/04

[52] U.S. Cl. .......................... 403/228; 403/220; 403/223; 40/642; 248/549

[58] Field of Search .............................. 40/606, 611, 608, 40/642, 651, 659, 649; 248/228, 549, 227, 900, 231.2; 81/128, 142; 269/122, 210, 233, 266, 275, 285; 403/374, 373, 368, 367, 334, 409.1, 116, 166, 220, 221, 225–228, 223

[56] References Cited

U.S. PATENT DOCUMENTS

| | | |
|---|---|---|
| 104,606 | 6/1870 | Lebeau . |
| 278,116 | 5/1883 | Fisher . |
| 561,151 | 6/1896 | Adrianse . |
| 612,316 | 10/1898 | Downes . |
| 755,384 | 3/1904 | Palmer . |
| 1,082,112 | 12/1913 | Cutler . |
| 1,348,145 | 8/1920 | Arden . |
| 1,599,066 | 9/1926 | Rushmore . |
| 1,637,305 | 7/1927 | Hendsch . |
| 1,666,079 | 4/1928 | Anderson . |
| 1,790,548 | 1/1931 | Schwartz et al. . |
| 1,867,276 | 7/1932 | McIntyre . |
| 1,884,971 | 10/1932 | Galbraith . |
| 1,939,968 | 12/1933 | Frei . |
| 2,062,156 | 11/1936 | Zerbst . |
| 2,094,051 | 9/1937 | Zakos . |
| 2,165,704 | 7/1939 | Hood . |
| 2,218,581 | 10/1940 | Levan . |
| 2,453,742 | 11/1948 | Bowen et al. . |
| 2,529,686 | 11/1950 | Green . |
| 2,787,433 | 4/1957 | Slavsky et al. . |
| 2,859,546 | 11/1958 | Gutterson . |
| 2,914,980 | 12/1959 | Flaig . |
| 2,981,018 | 4/1961 | Hopp et al. . |
| 3,015,897 | 1/1962 | Hopp . |
| 3,041,760 | 7/1962 | Slavsky . |
| 3,148,469 | 9/1964 | Umanoff . |
| 3,313,054 | 4/1967 | Madey . |
| 3,429,539 | 2/1969 | Lucietto et al. . |
| 3,530,605 | 9/1970 | Gutterson . |
| 3,714,724 | 2/1973 | Slavsky . |
| 3,728,806 | 4/1973 | Kostiuk . |
| 3,765,633 | 10/1973 | Caudill . |
| 3,797,143 | 3/1974 | Miller . |
| 3,879,024 | 4/1975 | Scott et al. . |
| 3,899,841 | 8/1975 | Berger . |
| 3,941,028 | 3/1976 | Lobello et al. . |

(List continued on next page.)

FOREIGN PATENT DOCUMENTS

| | | |
|---|---|---|
| 627993 | 3/1936 | Germany . |

*Primary Examiner*—Anthony Knight
*Attorney, Agent, or Firm*—Collier, Shannon, Rill & Scott

[57] ABSTRACT

An advertising display mounting device is provided for attaching promotional displays, dispensers, or other objects to a price channel mounted on the edge of a grocery or other retail store shelf. This mounting device uses clips which are adapted to mate with the price channel of the shelf. The clips are forced into a mated relation with the price channel by a locking slide. The invention also provides for a means by which to attach an advertising display to the advertising display mounting device.

9 Claims, 3 Drawing Sheets

U.S. PATENT DOCUMENTS 4,016,977 4/1977 Krautsack .
4,050,265 9/1977 Drennen et al. .
4,373,693 2/1983 Greenberger .
4,415,316 11/1983 Jürgens .
4,420,082 12/1983 Bernie .
4,466,592 8/1984 Janson .
4,537,310 8/1985 Thul .
4,541,598 9/1985 Villanueva et al. .
4,572,380 2/1986 Langwell .
4,584,898 4/1986 Panushka .
4,805,331 2/1989 Boggess et al. .
5,207,349 5/1993 Kringel .
5,237,767 8/1993 Kringel et al. .
5,289,652 3/1994 Kringel et al. .
5,344,250 9/1994 Kringel et al. .

ADVERTISING DISPLAY MOUNTING DEVICE

This application is a continuation of prior application Ser. No. 07/949,991 filed on Sept. 24, 1992, now U.S. Pat No. 5,344,250 which is a divisional of prior application Ser. No. 07/704,835 filed on May 20, 1991, now U.S. Pat. No. 5,289,652, which is a continuation of prior application Ser. No. 07/311,743 filed on Feb. 17, 1989, now abandoned.

BACKGROUND OF THE INVENTION

The present invention relates to an advertising display mounting device and, in particular, to an advertising display mounting device for use in a grocery or other retail store. The mounting device of the present invention is specifically adapted to mount an advertising or promotional display device (commonly referred to as a "shelf talker"), or other object, on the edge of a shelf in a grocery or other retail store.

Certain mounting devices for attaching objects to shelves are well known. Mounting devices are available in the form of clamps, brackets, fittings, etc. Many mounting devices that have been used previously, however, are not suitable for mounting advertising and promotional materials, or other objects on a grocery or other retail store shelf.

Shelves in grocery and other retail stores typically have a channel attached to the distal edge of the shelf. These channels are generally referred to as "price channels." Price channels are typically formed of extruded metal sections, such as an extruded aluminum section. Price channels are adapted to accept cards that display price, weight, or other product information and price channels have also been used to mount advertising and promotional materials on grocery or other retail store shelves.

Mounting devices that have been used prior to the present invention to mount advertising and promotional materials on a grocery or other retail store shelf typically orient the materials being displayed parallel to the price channel and, consequently, parallel to the edge of the shelf. Such devices are disclosed by Made, U.S. Pat. No. 3,313,054 for Display Devices (Jun. 9, 1965); Krautsack, U.S. Pat. No. 4,016,977 for Assemblage With Dual Support (Apr. 12, 1977); Bernie, U.S. Pat. No. 4,420,082 for Tab Mounted Dispenser (Dec. 13, 1983); and Langwell, U.S. Pat. No. 4,572,380 for pad Holder Adapted for Multiple Modes of Mounting and Associated Methods (Feb. 25, 1986). Each of these patents discloses a mounting device that is inserted into the price channel. Each of the display devices disclosed in these patents orients the materials parallel to the grocery or other retail store shelf.

In this orientation, the materials are not readily visible to the consumer as the consumer proceeds down the aisle, until the consumer is directly in front of the display. It is desirable to orient the advertising or promotional materials so that the display is substantially perpendicular to the shelf and extends out into the aisle. In that orientation, the display can be seen by the consumer even from the ends of the aisle. Mounted in this way, however, the advertising and promotional materials stick out into the aisle and may be accidentally or intentionally hit, bumped, on dislodged.

Those mounting devices that are capable of displaying advertising and promotional materials in a conspicuous fashion so that they extend out into the aisle frequently have multiple mechanical parts, may be bulky, and may have elements or parts that extend away from the body of the mounting device. Some mounting devices that have been used prior to the present invention clamp onto the upper and lower surfaces of the shelf adjacent the edge. In that position, however, the mounting device takes up valuable display space. Many mounting devices have elements or parts that extend away from the body of the mounting device, such as clamps or brackets. Such elements or parts tend to detract from the overall appearance of the mounting device and may obstruct use of the adjoining shelf space or access to products displayed on the shelf. Moreover, the customer may bump into these parts or elements or snag clothing or jewelry on them.

Certain mounting devices known prior to the present invention are unable to withstand rough usage to which a mounting device may be subject in a grocery or other retail store. In-store promotional programs may require that the mounting device remain in place in a store for periods of months at a time, or longer. During that period, the display material and mounting device may be repeatedly bumped and manipulated. Unless the mounting device is resilient and durable, it may not be able to withstand even accidental abuse and remain in place on the shelf for the full duration of the promotional program.

Many mounting devices that have been used prior to the present invention may not provide a firm and secure mounting. Display devices that have been used prior to the present invention in grocery stores typically are not firmly anchored into the price channel. Many such mounting devices are simply inserted into the price channel or are held in place with relatively little force, such as by the resiliency of the material of which the mounting device is constructed, or simply by the force of gravity. Such devices may be easily dislodged from the price channel or can be intentionally removed from the price channel with relatively little force.

Further, mounting devices mounted on the distal edges of grocery or other retail store shelves are readily accessible and are frequently subject to vandalism or intentional abuse. It is not uncommon for children, or others, to pull on the advertising display or to hang from it, thereby, placing substantial force on the attachment point. In addition, persons having access to the display may mutilate it or its mounting. Many mounting devices that have been used prior to the present invention cannot withstand such abuse.

In addition, mounting devices used in promotional programs in retail stores should be easy to install and should be detachable. Frequently, at the end of a promotional campaign for a particular product, the display must be moved to another location in the store or to another store for use in the same or a different promotional campaign. In view of the temporary nature of many advertising or promotional campaigns, a mounting device adapted for mounting advertising or promotional materials on a shelf must be relatively inexpensive and must be easy to install. It is also desirable that the mounting device be detachable and reusable.

Certain improvements over mounting devices in use prior to the present invention are disclosed and claimed in copending applications by two of the inventors of the present invention. Kringel and Richardson, U.S. application Ser. Nos. 215,874 and 215,875 (filed Jul. 5, 1988). The mounting device disclosed and claimed in these inventors' co-pending applications employs a spreader and spring clip arrangement, in which the spreader is forced into the concave side of the spring clip to force flanges disposed on the edges of the spring clip into mounted relation with the price channel. Even this improved mounting device, however, requires that substantial force be applied to the adjustment screw in order to ensure secure attachment of the mounting device to the price channel.

Accordingly, there is a need for an easy to use mounting device that will provide a means for attaching dispensers, advertising and promotional materials or displays, shelf talkers, or other objects to a shelf in a grocery or other retail store that is attractive, inexpensive, easy to install, detachable, and provides a sound and compact attachment. Moreover, such a device must be resilient and must be able to withstand rough usage, including being bumped, vandalized, and tampered with. Prior art approaches do not adequately address the problem of providing such a mounting device.

OBJECTS OF THE INVENTION

The primary object of the present invention, therefore, is to provide a device for mounting advertising and promotional materials, or dispensers, or other display devices on a grocery or other retail store shelf.

A further object of the present invention is to provide an inexpensive mounting device.

Another object of the present invention is to provide a mounting device that is easy to install.

An additional object of the present invention is to provide a mounting device that is detachable and reusable.

Yet a further object of the present invention is to provide a compact and attractive mounting device.

Another object of the present invention is to provide a durable, resilient, and easily maintained mounting device that will withstand severe usage conditions and accidental or intentional abuse.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

SUMMARY OF THE INVENTION

The present invention overcomes the disadvantages of the prior art and attains the objects of the invention by providing a mounting device for attaching a dispenser, shelf talker, advertising or promotional materials, product display, or other object to the price channel of a grocery or other retail store shelf. The present invention provides a firm, durable, and resilient attachment to a price channel on a shelf in a grocery or other retail store. Similarly, the present invention provides a compact and attractive, yet, inexpensive mounting device. Moreover, the present invention provides an easy to install, detachable, and reusable mounting device.

To achieve the objects, and in accordance with the purposes of the invention, as embodied and broadly described herein, the invention is a mounting device for attaching an object to a price channel, comprising: first clip means; second clip means having a body, said body having a slot formed therein, said slot for cooperating with said first clip means, a channel formed therein, and a second clip; locking slide means for cooperating with said channel and said first clip means to force said first clip means and said second clip means into mated relation with the price channel; and attachment means for connecting the object to said second clip means.

It is to be understood that both the foregoing general description and the following detailed description are exemplary and explanatory only and are not restrictive of the invention as claimed.

The accompanying drawings, which are incorporated herein by reference and constitute a part of this specification, illustrate one embodiment of the invention, and together with the description, serve to explain the principles of the invention.

DESCRIPTION OF THE PREFERRED EMBODIMENT

Figure 1:
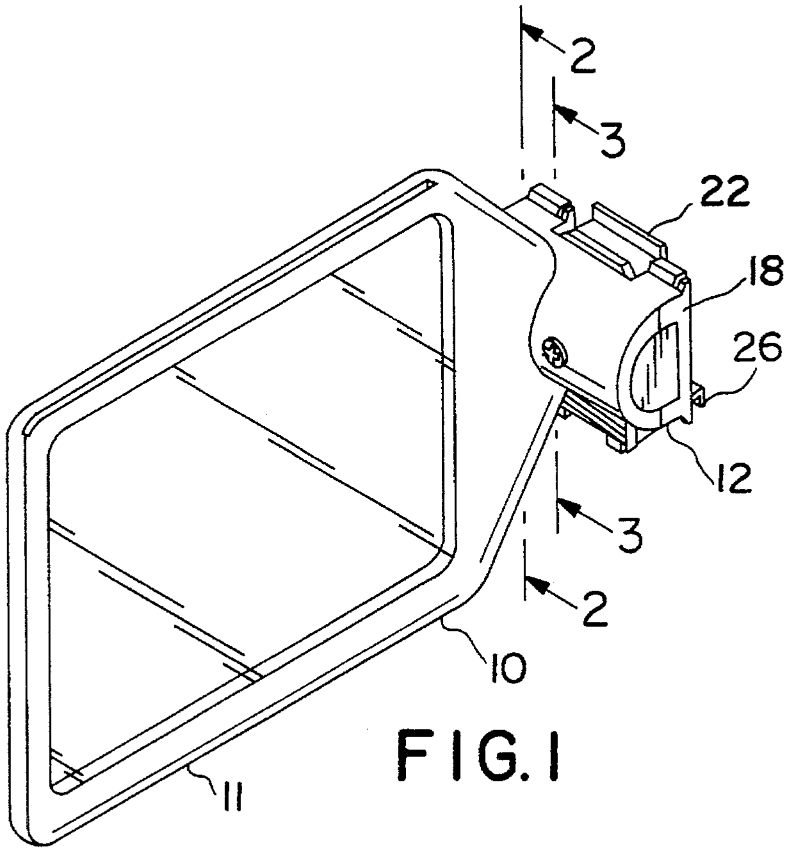
FIG. 1 is a perspective view of a preferred embodiment of the mounting device of the present invention.
Figure 2:
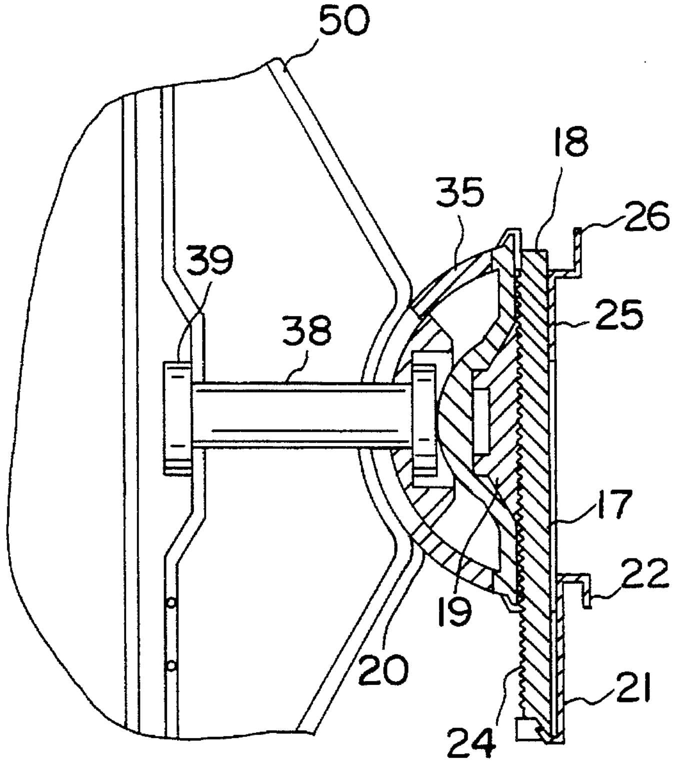
FIG. 2 is a sectional view of the mounting device shown in FIG. 1, along section 2—2.
Figure 3:
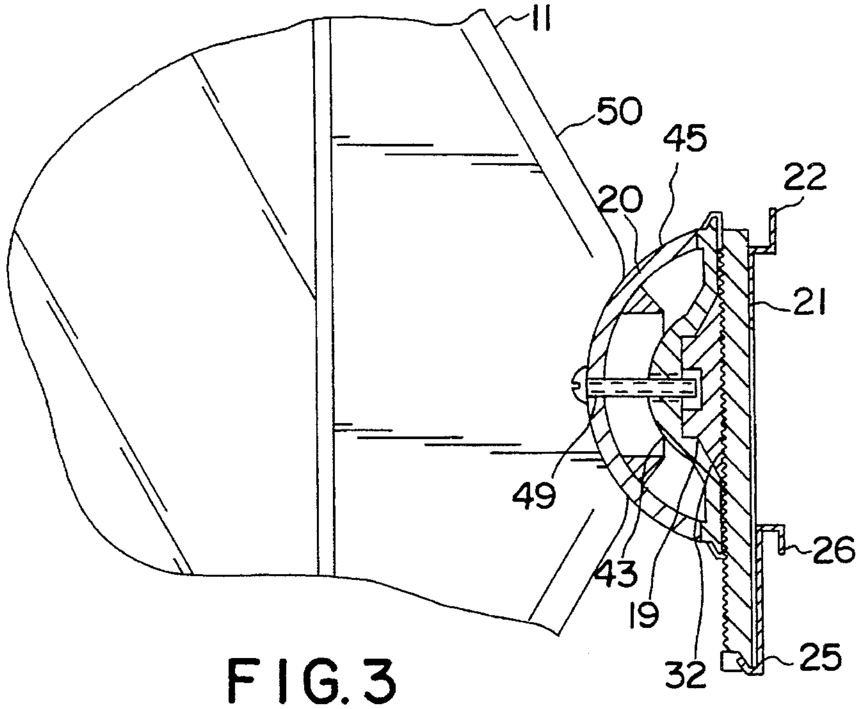
FIG. 3 is a sectional view of the mounting device shown in FIG. 1, along section 3–3.
Figure 4:
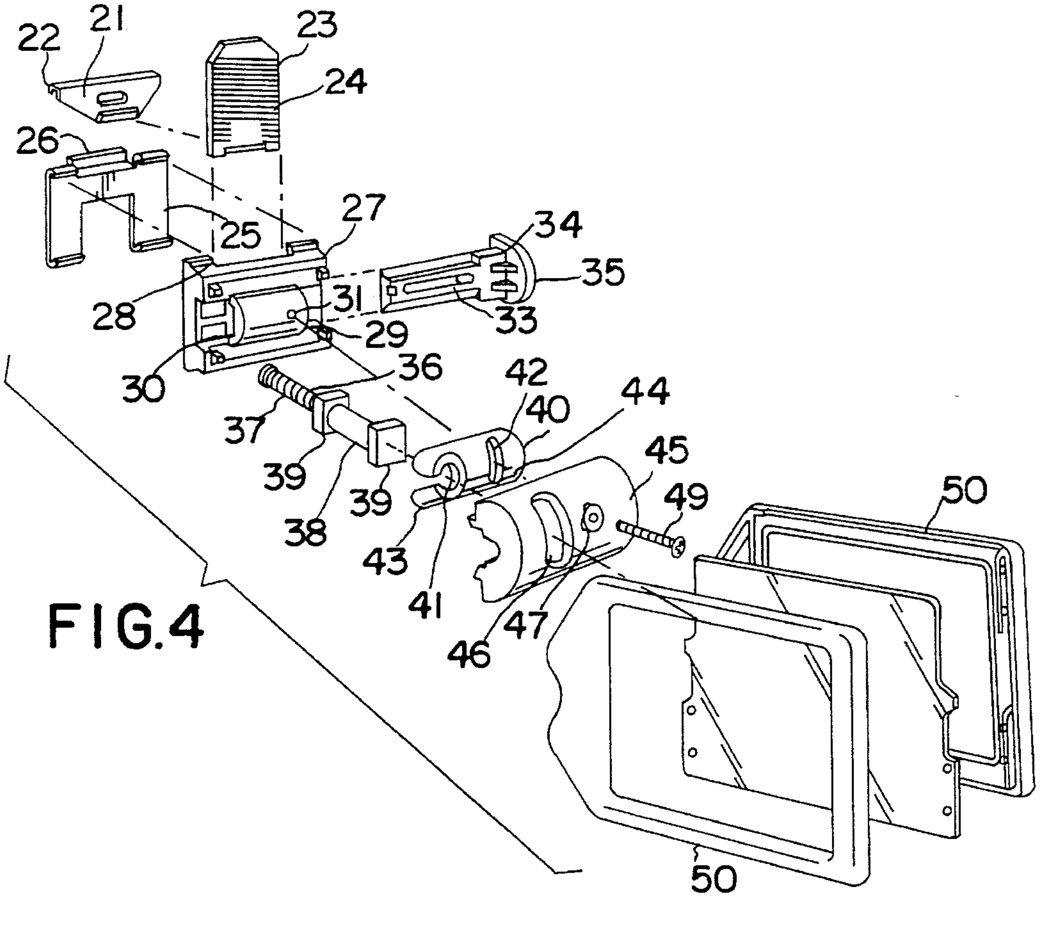
FIG. 4 is an exploded perspective view of the mounting display device shown in FIG. 1.
Figure 5:
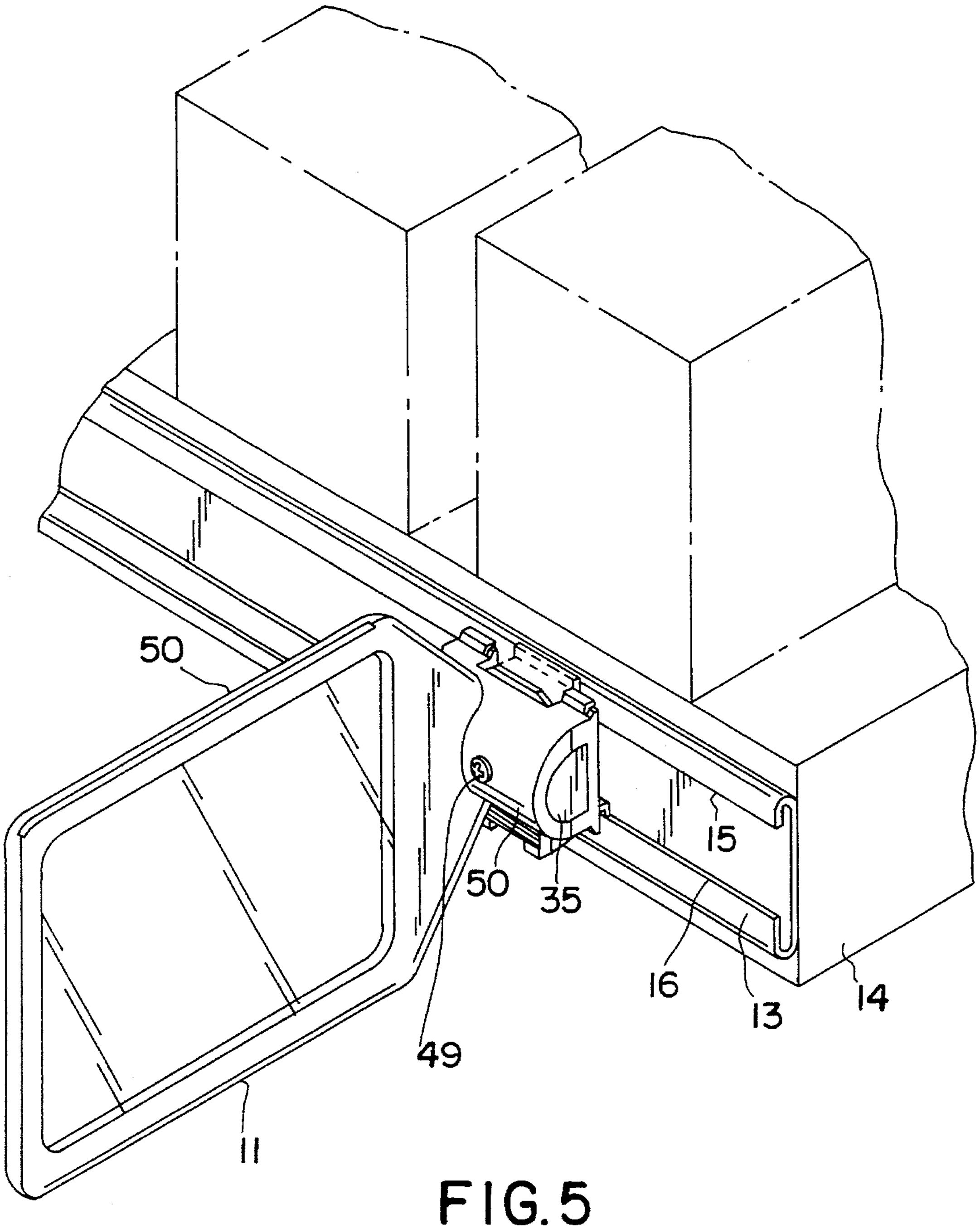
FIG. 5 is a perspective view of the advertising display device of the present invention as installed in a price channel on a retail store shelf.

Reference will now be made in detail to a present preferred embodiment of the invention, an example of which is illustrated in the accompanying drawings. A preferred embodiment of the advertising display mounting device of the invention is shown in FIG. 1 as 10.

In accordance with the invention, advertising display mounting device 10 has a mounted object 11 and mounting device 12. In a preferred embodiment of the present invention, object 11 is a display card holder or shelftalker 11. Mounting device bracket 12 cooperates with price channel 13 on shelf 14 in a grocery or other retail store to hold object 11 firmly and resiliently in place on shelf 14. Shelf 14, in a typical grocery store or other retail store, has a price channel 13 disposed along its distal edge. Price channel 13 is adapted to hold cards providing pricing or other product information and is adapted to receive various types of mounting hardware. Price channel 13 has upper 15 and lower 16 lips to facilitate attachment of price cards or various advertising and promotional materials to price channel 13.

Mounting bracket 12 has first clip means 17, second clip means 18, a locking slide 19 (which forces first clip means 17 and second clip means 18 into mounted relation with price channel 13), and attachment means 20 for securing to said second clip means 18 shelftalker 11 (or other object being mounted).

In a preferred embodiment of the present invention, first clip means 17 has a first clip 21, slide 23, and first teeth 24. As embodied herein, first clip 21 is preferably constructed of spring steel, or other suitable material having similar resilient properties. First clip 21 has a first clip flange 22, oriented at an acute angle relative to first clip 21. First clip flange 22 cooperates with lower lip 16 of price channel 13. In a preferred embodiment of the present invention, first clip 21 is mounted on slide 23 so that first clip flange 22 extends away from slide 23 and proximal to price channel 13. (acrylonitrile-butadiene-styrene) Slide 23 is preferably constructed of resilient plastic material, such as ABS plastic, or other suitable material having similar resilient properties. First clip 21 is mounted on slide 23 by welding first clip 21 to slide 23. Slide 23 has a surface distal from price channel 13, having first teeth 24 formed therein. First teeth 24 are disposed in non-parallel relation to the horizontal axis of the mounting device parallel to the longitudinal edge of the shelf and price channel.

In a preferred embodiment of the present invention, second clip means 18 has a second clip 25 and body 27. As embodied herein, second clip 25 is preferably constructed of spring steel, or other suitable material having similar resilient properties. Second clip 25 has a second clip flange 26, oriented at an angle relative to second clip 25. Second clip flange 26 is adapted to cooperate with upper lip 15 of the price channel 13. In a preferred embodiment of the present invention, second clip 25 is mounted on body 27 so that second clip flange 26 extends away from body 27 and proximal to price channel 13. Body 27 is preferably constructed in the form of back plate 27, of resilient plastic material, such as ABS plastic, or other suitable material having similar resilient properties. Second clip 25 is mounted on back plate 27 by welding second clip 25 to back plate 27, in the same manner as first clip 21 is welded to slide 23.

As embodied herein, back plate 27 has slot 28 formed therein for receiving slide 23, so that first teeth 24 are accessible through slot 28 of back plate 27. Slide 23 is adapted to fit into slot 28 in back plate 27 of second clip means 18 and is held in place by locking slide 19. In a preferred embodiment of the present invention, back plate 27 has cam 29. Cam 29 traverses slot 28 and is arched in its transverse direction to form channel 30 along its longitudinal axis parallel to the axis of price channel 13. Channel 30 is oriented substantially at a right angle relative to slot 28. Channel 30 is open at both ends of cam 29 and back plate 27. Back plate 27 also has threaded aperture 31 formed in cam 29 to cooperate with and allow passage of fastener means 49 through cam 29.

As embodied herein, mounting device 12 has locking slide means 19, which is preferably in the form of a locking slide constructed out of a resilient plastic material, such as ABS plastic, or other suitable material having similar resilient properties. In a preferred embodiment of the present invention, locking slide 19 has second teeth 32, security slot 33, stop 34, and handle 35. Second teeth 32 are disposed on the surface of locking slide 19, proximal to price channel 13 and shelf 14. Second teeth 32 are disposed in non-parallel relation to the horizontal axis of mounting device 12 and are oriented to cooperate with first teeth 24. The horizontal axis of mounting device 12 is typically the longitudinal axis of the device as shown in the figures and is disposed parallel to the edge of the shelf and to the longitudinal axis of the price channel, when the mounting device is in mounted relation to the shelf and price channel.

In a preferred embodiment of the present invention, security slot 33 is disposed along the horizontal axis of locking slide 19 on the surface of locking slide 19 distal from price channel 13. Security slot 33 extends a substantial longitudinal extent of locking clip 19. In a preferred embodiment of the present invention, stop 34 and handle 35 are disposed on the trailing end of the surface of locking slide 19 distal from price channel 13. Stop 34 and handle 35 are disposed on the edge of locking slide 19 at the point where locking slide 19 has reached its furthest extent of travel through earn 29 of back plate 27 and where further travel of locking slide 19 would push locking slide 19 out the opposite side of back plate 27 and mounting device 12. Stop 34 is disposed so that it abuts cam 29 when locking slide 19 is fully engaged in back plate 27 and cam 29. Handle 35 is disposed so that it abuts back plate 27 as locking slide 19 is fully engaged in mounting device 12.

In a preferred embodiment of the present invention, locking slide 19 is adapted to cooperate with earn 29. Locking slide 19 is inserted into channel 30 formed by cam 29 and back plate 27 causing second teeth 32 to mate and cooperate with first teeth 24 on slide 23. First teeth 24 and second teeth 32 are disposed so that, as locking slide 19 is inserted into channel 30, second teeth 32 mesh with first teeth 24 to force first clip 21 away from second clip 25. As locking slide 19 is inserted into channel 30 until stop 34 of locking slide 19 abuts earn 29, second teeth 32 cooperate with first teeth 24 to force first and second clip means 17 and 18 into engagement with upper and lower lips 15 and 16 of price channel 13.

It will be apparent to those skilled in the art that various modifications and variations can be made in the construction of first clip means 17, second clip means 18, and locking slide means 19 of the present invention without departing from the scope or spirit of the invention. For example, second clip means 18 could further comprise a second movable clip and a separate body element so that both first and second clips 21 and 25 could move relative to locking slide 19. Similarly, slot 28, cam 29, channel 30, and locking slide 19 could assume a variety of shapes and configurations while performing the function of holding and moving first clip means 17 relative to second clip means 18 and facilitating mating of first 24 and second 32 teeth. Alternatively, first teeth 24 and second teeth 32 could be oriented in substantially parallel relation to first clip means 17 and second clip means 18 to perform a locking function in order to fix mounting device 12 to price channel 13. Hence, it is intended that the present invention cover the modifications and variations of the invention, provided they come within the scope of the appended claims and their equivalents.

In a preferred embodiment of the invention, mounting device 12 has attachment means 20. As embodied herein, attachment means 20 comprises resilient connector means 36, lock plate 40, shroud 45, and fastener means 49. Resilient connector means 36, in a preferred embodiment of the present invention, comprises spring 37 and extension limiter 38. As embodied herein, spring 37 is preferably constructed out of music wire, or other suitable material having similar properties. In a preferred embodiment of the present invention, extension limiter 38 comprises spring sheath 38 which is preferably constructed out of polyurethane plastic material or other_ suitable material having similar elastic properties.

As embodied herein, spring sheath 38 serves to limit the degree of extension of spring 37 in order to prevent inelastic deformation of spring 37 in the event display device 10 of the present invention is subject to undue stress, rough handling, or abuse. Spring sheath 38 is constructed of material having a higher rate of cross-sectional reduction under elastic deformation than spring 37. Spring 37 is inserted into spring sheath 38 and spring 37 and spring sheath 38 are secured by means such as heat shrinking spring sheath 38 onto spring 37, compression fit between spring 37 and spring sheath 38, or other suitable means. Spring sheath 38 is dimensioned to prevent extension of spring 37 beyond its limits of elastic deformation. As spring 37 and extension limiter 38 deform elastically during extension, extension limiter 38 is reduced in cross-section more rapidly than is spring 37, until they reach a cross-point in their elastic deformation, resulting in limitation of further extension of spring 37.

It will be apparent to those skilled in the art that various modifications and variations can be made in the construction of resilient connector means 36, spring and spring sheath 38, without departing from the scope or spirit of the invention.

For example, resilient connector means 36 could comprise various types of springs, cordage, tubing, or other suitable resilient attachment means or combinations thereof. Alternatively, connector means 36 could be a rigid connector, rather than resilient connector means. Spring 37 could comprise any of a variety of elastic materials such a rubber or elastic cord or other suitable materials. Spring sheath 38 could comprise natural rubber tubing, silicon rubber tubing or other materials having suitable cross-elasticity relative to spring 37. Hence, it is intended that the present invention cover the modifications and variations of the invention, provided they come within the scope of the appended claims and their equivalents.

In a preferred embodiment of the present invention, resilient connector means 36 secures display device 11 to second clip means 18. As embodied herein, spring sheath 38 has first and second ends 39 having outer diameters greater than that of the body of spring sheath 38. In a preferred embodiment of the present invention, lock plate 40 has key way 41 formed therein, fastener means slot 42, first earn surface 43, and second cam surface 44. As embodied herein, key way 41 is dimensioned larger than the outside diameter of the body of extension limiter 38, yet smaller than the outer diameter of end regions 39. Key way 41 engages spring sheath 38, restraining proximal end 39 of spring sheath 38 against first cam surface 43 of lock plate 40. In a preferred embodiment of the present invention, the concave surface of shroud 45 is placed over second cam surface 44 of locking plate 40, locking slide 19, and first and second clip means 17 and 18. Shroud 45 has resilient connector means slot 46 formed therein which permits passage of resilient connector means 36 through shroud 45. In a preferred embodiment of the present invention, distal end 39 of extension limiter 38, opposite end 39 anchored under lock plate 40, extends through resilient connector means slot 46 of shroud 45, where it is mounted in display device 11.

In a preferred embodiment of the present invention, display device 11 is a plastic frame holder for a shelf talker which has two halves 50 which are adapted to receive distal end 39 of extension limiter 38 and grip distal end 39 when display device halves 50 are secured to each other. The distance between the points where ends 39 of extension limiter 38 are secured when the elements of advertising display mounting device 10 are in mounted relation is slightly less than the length of spring sheath 38 between proximal and distal ends 39 in its unstressed state, thereby placing resilient connector means 36 under tension, and shroud 45 and lock plate 40 in compression. As embodied herein, the friction between the concave surface of shroud 45 and second earn surface 44 of lock plate 40 holds display device 11 in position once it has been adjusted.

In a preferred embodiment of the invention, shroud 45 also has a fastener means aperture 47 formed therein to permit passage of fastener means 49 through shroud 45 As embodied herein, fastener means 49 comprise screw 49, which extends through fastener means aperture 47, lock plate slot 41, and cooperates with threaded aperture 31 of cam 29 of back plate 27 to hold fastener means 49 firmly in place. In mounted relation, fastener 49 extends through threaded aperture 31 and extends into security slot 28 of locking slide 19, to prevent locking slide 19 from being withdrawn while fastener means 49 is in place.

As embodied herein, shroud 45 is held in compression against lock plate 40, and back plate 27 by fastener means 49, thereby providing an integral one screw adjustment mechanism for advertising display device 11. The dimensions and configuration of resilient connector means slot 46 fix the limits of rotation and movement of display device 11 relative to shelf 14. In a preferred embodiment of the present invention, resilient connector means slot 46 is dimensioned to permit rotation of object 11 through a range of positions relative to shelf 14.

It will be apparent to those skilled in the art that various modifications and variations can be made in the construction of attachment means 20, and in particular in the construction of lock plate 40, shroud 45, and fastener means 49 of the present invention without departing from the scope or spirit of the invention. For example, lock plate 40 could assume a variety of configurations while restraining proximal end 39 of extension limiter 38 and providing frictional resistance to hold resiliently in place display device 11. Similarly, shroud 45 could assume various configurations consistent with its function in the present invention. Fastener means 49 could comprise rivets, clips, security screws, or other fasteners. Hence, it is intended that the present invention cover the modifications and variations of the invention, provided they come within the scope of the appended claims and their equivalents.

In a preferred embodiment of the present invention, object 11 comprises a shelf talker or other advertising display device. It will also be apparent to those skilled in the art that various modifications and variations can be made in object 11. For example, other display devices could be mounted by means of mounting device 12 of the present t invention such as that disclosed in applicants' co-pending application for Coupon Dispenser Device. For example, the mounting device 12 of the present invention could also be used to mount product displays. Other alternative devices that could be mounted on a grocery or other retail store shelf by means of the present invention will be apparent to one of ordinary skill in the art. Hence, it is intended that the present invention cover the modifications and variations of this invention, provided they come within the scope of the appended claims and their equivalents.

I claim:

1. A mounting device for attaching an object to a price channel, comprising, first clip means;

second clip means having a body, said body having a slot formed therein, said slot for cooperating with said first clip means, a channel formed therein, and a second clip;

locking slide means for cooperating with said channel and said first clip means to force said first clip means and said second clip means into mated relation with the price channel; and attachment means for connecting the object to said second clip means.

2. The mounting device of claim 1, wherein said object is an advertising display device.

3. The mounting device of claim 1, wherein said object is a shelftalker.

4. The mounting device of claim 1, wherein said first clip means further comprises a first clip and first teeth for cooperating with said locking slide means.

5. The mounting device of claim 4, wherein said locking slide means further comprises one or more second teeth for cooperating with said first teeth.

6. The mounting device of claim 1, wherein said attachment means further comprises a resilient connector.

7. The mounting device of claim 1, wherein said attachment means further comprises a spring and an extension limiter to prevent extension of said spring past the limit of elastic deformation of said spring.

8. A connecting means for coupling a display means to a mounting means comprising:

a connector means for resiliently connecting said display means to said mounting means;

a locking plate for attaching said rigid connector to said mounting means;

a shroud abutting said locking plate and having a slot;

a sheath having a proximal and a distal end; and wherein a proximal end of said sheath is anchored under said shroud and against said locking plate and said sheath extends through said slot and said shroud; and wherein a distal end of said sheath is anchored in said display means.

9. The connecting means of claim 8, wherein the distance between said display means and said mounting means, when in a mounted relationship is less than the length of said sheath between said distal end and said proximal end in an unstressed state thereof.

* * * * *